United States Patent [19]

Bailey

[11] 3,817,345

[45] June 18, 1974

[54] CONTINUOUS BIT POSITIONING SYSTEM

[75] Inventor: John R. Bailey, Tulsa, Okla.

[73] Assignee: Senturion Sciences, Inc., Tulsa, Okla.

[22] Filed: June 18, 1973

[21] Appl. No.: 371,142

Related U.S. Application Data

[63] Continuation-in-part of Ser. No. 167,573, July 30, 1971, Pat. No. 3,739,871.

[52] U.S. Cl............ 181/.5 NP, 175/40, 73/151, 340/15.5 MC, 340/18 DC
[51] Int. Cl..................................................... G01v
[58] Field of Search............ 181/.5 NP, .5 R, .5 BE; 340/15.5 SC, 18 DC; 175/1, 40, 45; 166/308; 73/151; 61/72.7

[56] References Cited
UNITED STATES PATENTS

| | | | |
|---|---|---|---|
| 2,759,143 | 8/1956 | Arps | 340/18 P |
| 3,315,224 | 4/1967 | Ferguson | 73/151 |
| 3,518,840 | 7/1970 | Mertz | 61/72.7 |
| 3,520,375 | 7/1970 | Raynal | 73/151 |
| 3,739,871 | 6/1973 | Bailey | 181/.5 NP |

Primary Examiner—Samuel Feinberg
Assistant Examiner—J. V. Doramus
Attorney, Agent, or Firm—Head & Johnson

[57] ABSTRACT

This abstract describes a system by means of which the precise position of the drill bit, in three dimensions, in the earth, can be determined during the drilling operation with a minimum of effort and interruption to the drilling process. It provides placing a motion sensor on the drilling apparatus, and a plurality of vibration sensors or geophones, positioned in a two-dimension array on the surface of the earth, above the expected position of the drill bit. To make a measurement from which can be determined the position of the bit, the drill stem is raised a selected distance and suddenly released, so that it will fall in the borehole, and the bit will strike the bottom of the hole. This impact will cause an elastic wave to be generated at the bottom of the borehole. The elastic wave will be transmitted through the earth as a spherical wave upward to the surface, and will be detected by the geophones. The sensor at the drilling apparatus determines the instant at which the drill pipe starts to fall, from which time can be calculated, knowing the length of the drill pipe, the time when the bit strikes the bottom of the drill hole. This determines the initiation time of the elastic wave. The arrival times at the geophones of the elastic wave can be measured, and the position at which the elastic wave originated can be determined.

3 Claims, 3 Drawing Figures

PATENTED JUN 18 1974    3,817,345
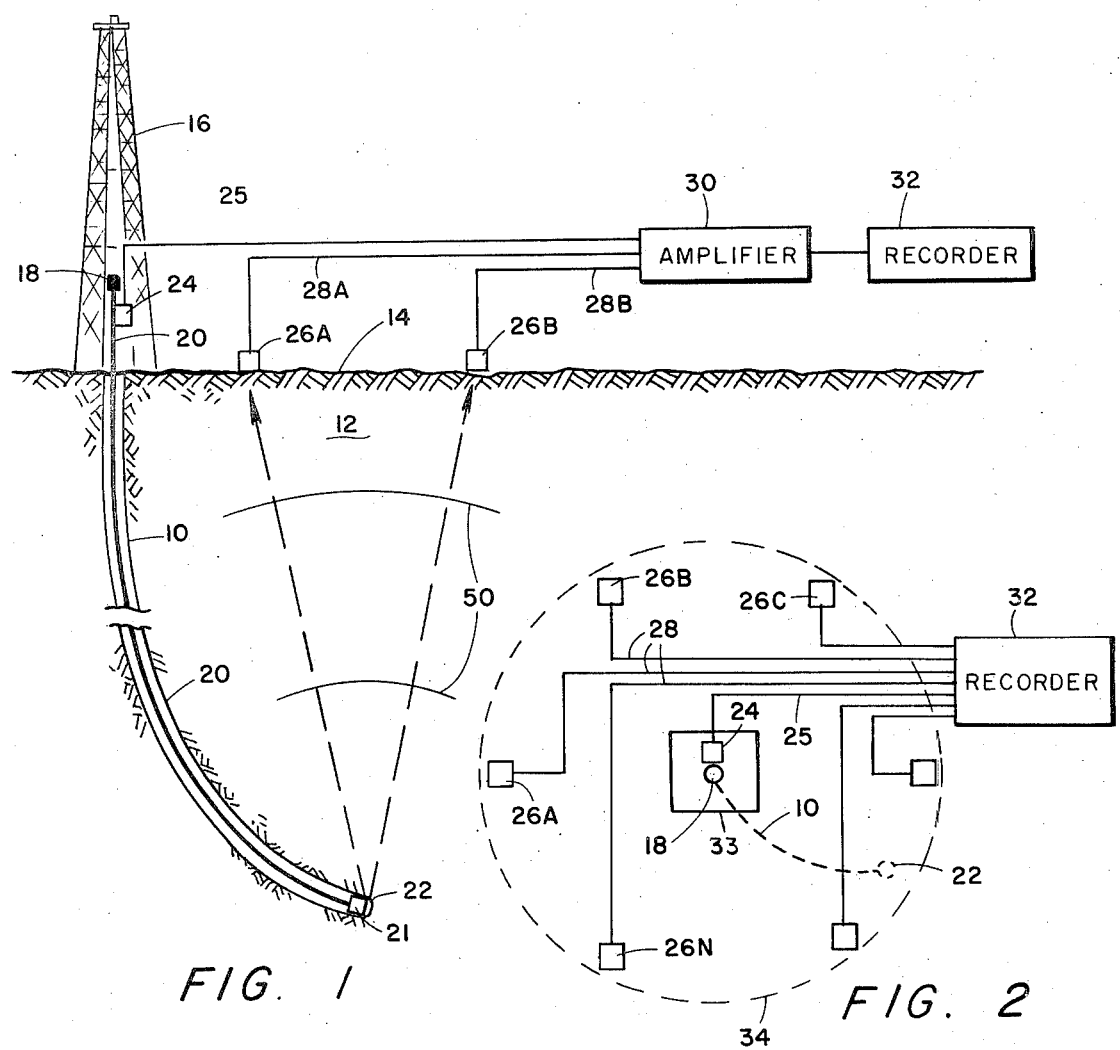
FIG. 1
FIG. 2
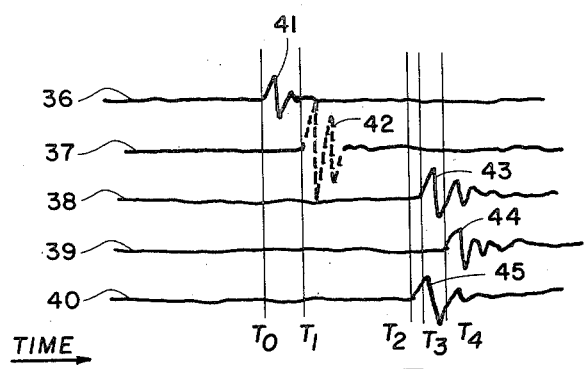
FIG. 3

CONTINUOUS BIT POSITIONING SYSTEM

CROSS-REFERENCES TO RELATED APPLICATIONS

This application is related to and is a continuation-in-part of my copending application Ser. No. 167,573, now U.S. Pat. No. 3,739,871, entitled "Mapping Of Earth Fractures Inducted By Hydrafracturing;" copending application Ser. No. 167,573 is entered into this application by reference.

BACKGROUND OF THE INVENTION

This invention is in the field of elastic wave detection in the earth. More particularly, it is concerned with determining the position in the earth of the drill bit during a drilling operation in a deep borehole.

In the prior art, various means have been devised for determining the position of the borehole in North-South, East-West coordinates, at selected depths during a drilling operation. This has been done by using survey instruments specially designed for introduction into the borehole, and sometimes introduced through the drill pipe, which by their internal mechanism make a record of the slope (or angle with the vertical) of the borehole at each of a plurality of selected depths, and a measure, in relation to the magnetic compass, of the azimuth of the slope of the borehole. Knowing the direction of slope, and magnitude of slope, at each of a plurality of selected known depths, and assuming that the borehole is straight in between the survey points at which measurements are made, the profile of the hole in three dimensions can be plotted.

The disadvantage of this particular system is that it requires a stoppage of the drilling process so that the drill pipe can be broken and the survey instrument inserted on a wire line into the drill pipe. Since the cost of operation of the drill rig runs into many hundreds of dollars a day, time lost from the drilling operation, to make these measurements, is extremely expensive. There is understandable reluctance on the part of drillers to make these necessary measurements, so that at some future time, when this knowledge is needed, it will not be available and cannot be easily obtained.

SUMMARY OF THE INVENTION

It is a primary object of this invention to provide a simple and inexpensive means for determining, at any selected time, a measurement indicative of the position of the bottom of the borehole during a drilling operation.

It is a further object of this invention to provide a method of determining the position of the bottom of the borehole without interrupting the drilling operation.

These and other objects are realized and the limitations of the prior art are overcome in this invention by attaching a sensor to the drilling mechanism, such as at the mud swivel, and providing a plurality of geophones, or other elastic wave earth motion sensors, placed on the surface of the earth. The drill pipe is lifted off bottom a few feet and is suddenly released. The time of the start of the fall of the drill pipe at the surface is indicated by the sensor. At some time later, which can be obtained by calculation, knowing the velocity of elastic waves in the drill pipe, the length of the drill pipe, there can be determined the time at which an elastic wave will be initated in the earth, at the bottom of the borehole, by the drill bit striking that bottom face. Sometime still later, the elastic wave will be received at the surface of the earth, and a record made of the arrival times, at each of the geophones. Knowing the time of release of the drill pipe, and the arrival times of the elastic wave, it can be determined from these data, the position of the drill bit at the time the elastic wave was initiated.

BRIEF DESCRIPTION OF THE DRAWINGS

These and other objects of this invention and a better understanding of the principles and details of the invention will be evident from the following description taken in conjunction with the appended drawings in which:

FIG. 1 represents a cross section of the earth and indicates the method of operation of the invention.

FIG. 2 indicates a suggested surface array of detectors, or sensors, particularly when used at an offshore drilling platform.

FIG. 3 indicates time records of the various signals generated and records.

DESCRIPTION OF THE PREFERRED EMBODIMENT

Referring now to FIG. 1 there is shown a cross section of the earth 12 with the earth's surface 14. There is a well 18 drilled in the earth. The borehole 10 is indicated as being curved and, therefore, the bottom of the borehole 22 is not directly below the well 18. There is no easy way of determining the exact position, in the earth, of the bottom of the borehole 22.

There is shown a drilling derrick 16 and a sensor 24 which is mounted on the side of the mud swivel, for example. The sensor can be an acceleration, velocity or displacement sensor. The actual drilling apparatus including the hoist cables, etc. are not shown, but are well known in the earth. The drill pipe 20 is rotated by the rotary table (not shown) at the surface, so that the bit 21 at the bottom of the borehole will cut the rock at point 22. The borehole is normally filled with drilling mud, which circulates down the drill pipe and up through the annulus, to carry the rock cuttings to the surface.

It is important to know the exact position, in space, of the point 22, because during the drilling operation it is important to know the curvature of the borehole and of the drill pipe so as to prevent damage to the drill pipe due to fatigue failure due to rotation and bending, and so on. This information is important also in setting casing.

The normal method of determining the position of the drill hole is to lower a survey instrument into the drill pipe. This requires breaking the drill pipe at the surface and stopping the drilling program. The survey instrument is lowered into the drill pipe at a plurality of spaced points, in depth, and at each point the slope, and azimuth of slope, of the drill pipe is determined. Commercial services are available to do this. From these data it is impossible to plot the approximate position of the borehole in space. The cost of interrupting the drilling process to take these data and the inaccuracy of the data leave much to be desired in the use of this method.

In accordance with this invention, the operation is to lay out a group of sensors of geophones 26A, 26B, etc.

on the surface of the earth 14, and to connect them to amplifiers 30 through leads 28A, 28B, etc. The sensor 24 is connected through lead 25 to the amplifier 30. All amplified signals go to a recorder 32. The recorder will show a record corresponding generally to that shown in FIG. 3, which will be described in detail later. The system of detecting elastic waves at the surface of the earth and determining from the known time of initiation of an elastic wave, and the arrival times at the surface, the precise position of the point or origin of the elastic wave, has been thoroughly described in my copending application, Ser. No. 167,573. In that application the source of the elastic wave was the fracturing of the rock at the point of application of a high pressure fluid to the rock.

In this application, the elastic wave is initiated by the impact of the drill pipe and the drill bit against the bottom of the borehole. This is accomplished by lifting the drill pipe and letting it fall suddenly, to strike the bottom.

One important datum that is needed is the time at which the drill bit strikes the bottom. This can be determined by recording the instant in time at which the drill pipe is released at the surface, by releasing the support cables in the drilling tower 16. The drill pipe is normally in tension because of the weight at each point, of the pipe below that point. Therefore, if the top end of the pipe is lowered suddenly, the tension in that portion of the pipe will be released, and that release in tension will travel down the pipe 20 as an elastic wave, at a rate corresponding to the velocity of transmission of elastic waves in the pipe. This can be determined by calculation, or by experiment, as is well known in the art. Recording the time at which the top end of the drill pipe is released, and knowing the length of the drill pipe.

This is indicated in FIG. 3, where trace 36 shows an event 41 at time T0, which represents the instant of release of the drill pipe at the surface. The horizontal coordinate is time. At some time later, determined by the interval between T0 and T1, the bottom of the drill pipe, or the drill bit, strikes the bottom of the borehole, and an event shown at 42 (in dashed outline) indicates the elastic wave generated in the earth, at the bottom of the borehole. This event 42 is now the source of the elastic wave which progress in the earth as a spherical wave outwardly from the point 22, as shown by the circles 50. As this elastic wave reaches the surface it will contact and be detected by the sensors 26A and 26B etc. The signals generated by the geophones will be recorded as events 43, 44, 45, etc. as shown on traces 38, 39, and 40. It will be clear that event 45, since it arrives before the other events, will indicate that its geophone will be the closest to the point 22. From its position, and the positions of the other sensors, and the arrival times T2, T3, and T4, etc. the position of the point 22 can be determined.

The manner in which the arrival times and the calculated instant of generation of the elastic waves can be processed to provide the location of the source of elastic waves is thoroughly described in my copending application Ser. No. 167,573. Reference is made to that application for full details as to the processing of these data. By calculating backward from the times of arrival at each of the sensors, and drawing spherical surfaces corresponding to the travel times T2-T1, T3-T1, etc., the point at which all of the spherical surfaces intersect in space will be the location of the source of the spherical waves that was detected by the sensors. It is necessary to have a plurality of sensors arranged in a two dimensional array on the earth's surface. Theoretically three sensors will be sufficient, although for practical purposes four or more are desired. This is because noise disturbances might mask one or more of the wave arrivals and therefore vitiate the use those sensors in the determination. As a practical operation five to ten or more spaced geophones would be desired.

As a practical operation this method would find great use in the offshore areas where drilling is done from a drilling platform such as 33. A plurality of detectors 26A, 26B, 26C...26N would be arrayed as shown in FIG. 2 over an area, larger in diameter than the expected displacement of the bottom of the borehole 22 from the well 18. Of course, in many drilling situations, wells are intentionally displaced horizontally, so that a large area of subsurface drainage can be taken care of by wells whose well heads are within a small area, generally the size of the platform.

On a dry land surface, any type of vibration detector or geophone, such as those customarily used in the seismic exploration systems, can of course be used. In an offshore water covered area it will probably be desirable to place the geophones on the sea floor, and connect them by cable to or radio telemetry to amplifiers and recorders on the drilling platform.

In the past, many people have tried to record the noises made while the well is being drilled, as an indication of the point at which the drilling operation is actually taking place. These have always been unsatisfactory, because of the large amount of noise generated by the rotation of the drill pipe along the whole length of the borehole, as well as the vibration set up at the surface of the earth, due to the engines, mud pumps and other moving apparatus at the drill site. The improvement of this invention has been the use of a particular source of energy for initiating the elastic wave, and that is the impact of the drill pipe on the bottom of the hole. During the short time while the drill pipe is falling the drilling operation must be stopped, so that there will be some reduction of general background noise. However, even so there will be considerable noise from the surface machinery and therefore a large grouping of detectors is desirable in order to obtain an improved indication of the point of origin of the elastic wave and therefore the position of the borehole.

While I have shown wire connections between the sensors and the amplifiers and the recorders, in view of the large dimensions of the array of sensors it will often be convenient to use radio transmission of the sensor signals. This can be in the form of analog or digital telemetry, as is well known in the art.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. The method of determining the position in the earth of the bottom of a borehole, during the drilling of said borehole by the rotary method, the length of drill pipe being known, comprising:

a. placing a plurality of sensors in the earth in a known geometric pattern above the expected position of the bottom of the borehole, said sensors adapted to detect and transduce the vibrations of the earth to corresponding electrical signals, and amplifying said transduced signals;

b. lifting the drill pipe a selected distance, and suddenly releasing the drill pipe, so that it falls in the borehole until the drill bit strikes the bottom of the well bore, whereby the impact of the drill bit on the bottom of the well bore will generate an elastic wave in the earth;

c. determining the time of release of said drill pipe;

d. recording as a function of time said amplified transduced signals and determining the times of arrival of said elastic wave at said sensors; and e. from the known time of release of said drill pipe and the known length of drill pipe and the times of arrival of said elastic wave at said sensors, determining the position of said bottom of the borehole.

2. The method as in claim 1 including the step of determining from the known time of release and the known length of drill pipe, the time of generation of said elastic wave.

3. The method as in claim 1 in which said sensors are arrayed within a circle the center of which is at the well head, and the perimeter is outside the maximum expected radius of said bottom of said borehole.

* * * * *